US005747150A

United States Patent [19]

Yamamoto et al.

[11] Patent Number: 5,747,150

[45] Date of Patent: May 5, 1998

[54] ELECTROSTATIC POWDER COATING METHOD

[75] Inventors: Masahiro Yamamoto, Tokyo; Akimitsu Uenaka, Suita, both of Japan; Tasaburo Ueno, Rocky River, Ohio; Koichi Tsutsui, Kyoto, Japan

[73] Assignee: Nippon Paint Co., Ltd., Osaka, Japan

[21] Appl. No.: 714,612

[22] Filed: Sep. 16, 1996

Related U.S. Application Data

[63] Continuation-in-part of Ser. No. 360,298, Dec. 21, 1994, abandoned.

[30] Foreign Application Priority Data

Dec. 21, 1993 [JP] Japan .................................... 5-322096

[51] Int. Cl.[6] .............................. B32B 7/02; B32B 27/36; B05D 1/06; B05D 1/36

[52] U.S. Cl. .......................... 428/220; 428/458; 428/480; 427/470; 427/475; 427/486; 427/409

[58] Field of Search .................................... 427/470, 475, 427/485, 486, 407.1, 409, 419.1, 419.2; 252/511, 520; 428/220, 458, 480, 502, 323, 408, 336

[56] References Cited

U.S. PATENT DOCUMENTS

| | | | |
|---|---|---|---|
| 3,832,226 | 8/1974 | Kondo et al. | 427/486 |
| 4,789,566 | 12/1988 | Tatsuno et al. | 427/388.2 |
| 5,242,716 | 9/1993 | Iwase et al. | 427/407.1 |

FOREIGN PATENT DOCUMENTS

| | | |
|---|---|---|
| 309 286 | 3/1989 | European Pat. Off. . |
| 659491A2 | 6/1995 | European Pat. Off. . |
| 24 50 260 | 5/1976 | Germany . |

*Primary Examiner*—Shrive Beck
*Assistant Examiner*—Fred J. Parker
*Attorney, Agent, or Firm*—Townsend & Banta

[57] ABSTRACT

An electrostatic powder coating method of forming an undercoating film having a volume specific resistivity of not more than $10^{13}$ Ω·cm and a thickness of not more than 200 μm on a metal surface and forming an overcoating layer on the undercoating film by electrostatic powder coating. The undercoating film is composed of a plurality of layers with only the top layer containing a conductive material.

13 Claims, 1 Drawing Sheet

ELECTROSTATIC POWDER COATING METHOD

This application is a continuation-in-part of application Ser. No. 08/360,298, filed Dec. 21, 1994 abandoned.

BACKGROUND OF THE INVENTION

1. Field of the Invention

The present invention relates to a method of electrostatically powder-coating an undercoating film which is formed on a metal surface, and more particularly, it relates to an electrostatic powder coating method which can improve the amount of transfer by electrostatic powder coating.

2. Description of the Background Art

In general, electrostatic coating of a metal surface is generally carried out by spraying a solvent type coating. While the metal surface may be directly electrostatically coated, an undercoating film is generally formed on the metal surface so that an overcoating layer is formed on this film by electrostatic coating, in order to improve corrosion resistance, smoothness and the like.

However, employment of such a solvent type coating is undesirable in consideration of sanitation and environmental conservation, due to volatilization of the solvent. To this end, electrostatic powder coating by electrostatically coating a target with a powder coating has been studied.

When an undercoating film which is formed on a metal surface is electrostatically coated with a powder coating, however, the transfer efficiency is extremely reduced as compared with a case of electrostatically coating with a solvent type coating. The transfer efficiency, which is not much reduced when the metal surface is directly coated with the powder coating, is extremely reduced when an undercoating film is formed on the metal surface and electrostatically coated with the powder coating.

It is also known from U.S. Pat. No. 3,832,226 to Kondo, et al. to apply a conductive base primer layer onto a metal substrate prior to applying an electrostatic powder coating. The primer layer is applied as a solution of a resin containing electroconductive particles which includes powder of, for example, aluminum and carbon black. The dried primer layer has a thickness of preferably from 10–100 microns and a volume resistivity of $10^9$–$10^{14}$ ohm-cm. The Kondo, et al. patent does not disclose the use of multiple layers as making up the conductive base primer.

SUMMARY OF THE INVENTION

An object of the present invention is to provide an electrostatic powder coating method of electrostatically coating an undercoating film formed on a metal surface, which can improve the transfer efficiency.

The electrostatic powder coating method according to the present invention comprises the steps of forming an undercoating film having a volume specific resistivity of not more than $10^{13}$ Ω·cm. and a thickness of not more than 200 μm on a metal surface, and forming an overcoating layer on the undercoating film by electrostatic powder coating.

According to the present invention, it is not necessary to drastically reduce the volume specific resistivity of the undercoating film, which is not more than $10^{13}$ Ω·cm. In consideration of economy and practicality, the volume specific resistivity is preferably in the range of $10^8$ to $10^{13}$ Ω·cm. It is possible to reduce the volume specific resistivity of the undercoating film to not more than $10^{13}$ Ω·cm by a method of introducing conductive particles into the undercoating film. The conductive particles may be prepared from carbon black or a conductive metal oxide such as zinc oxide or tin oxide.

The undercoating film may alternatively contain an organic conductive material such as a cationic, anionic or nonionic surface active agent which is known as an antistatic agent, for example.

When the undercoating film is formed by a water-borne coating, the coating may be dried to leave moisture in the undercoating film, thereby providing the film with conductivity.

If the thickness of the undercoating film exceeds 200 μm, improvement of the transfer efficiency is insufficient due to insufficient conductivity. The undercoating film is preferably formed of a plurality of layers, with only a top layer being provided with conductivity. Preferably, the base layer and intermediate layer in the undercoating film are nonconductive and do not contain a conductive material.

According to the present invention, the undercoating film has a volume specific resistivity of not more than $10^{13}$ Ω·cm and a thickness of not more than 200 μm. Therefore, charges of the powder coating adhering to the undercoating film are not stored in but discharged through this film. Thus, no back ionization is caused by charges of the same polarity which are stored in the undercoating film, and it is possible to stick a charged powder coating onto the undercoating film in an excellent state, thereby improving the transfer efficiency.

Japanese Patent Laid-Open Nos. 58-64164 (1983), 61-74682 (1986) and 3-80966 (1991) disclose methods of forming conductive coating films on nonconductive materials such as plastic through conductive primers or the like and electrostatically coating the films. However, every one of these conductive coating films is formed as an earth electrode which is employed for electrostatically coating the nonconductive material such as plastic, and must have a considerably low volume specific resistivity.

On the other hand, it is not necessary to drastically reduce the volume specific resistivity of the undercoating film which is employed in the present invention, since its surface potential is only slightly increased due to the presence of the metal surface provided under the same.

It is possible to remarkably improve the transfer efficiency in electrostatic powder coating by reducing the volume specific resistivity of the undercoating film to not more than $10^{13}$ Ω·cm according to the present invention.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention is now described with reference to Examples.

EXAMPLE 1 AND COMPARATIVE EXAMPLE 1

Steel plates were coated with undercoats A and B according to Example 1 and comparative example 1, respectively, and the undercoating films as formed were coated with a polyester-based powder coating (by Nippon Paint Co., Ltd.), respectively, to be subjected to comparison of transfer efficiencies.

Solid contents in the undercoats A and B were adjusted as shown in Table 1.

TABLE 1

| | Undercoat A | Undercoat B |
|---|---|---|
| Polyester Resin | 41.0 | 41.0 |
| Melamine Resin | 24.1 | 24.1 |
| Titanium Oxide | 9.2 | 24.1 |
| Carbon Black | 12.0 | 0.1 |
| Barium Sulfate | 13.7 | 13.7 |
| Total | 100.0 | 100.0 |

The undercoats A and B contained polyester resin (by Nippon Paint Co., Ltd.) and curing agents of melamine resin (by Nippon Paint Co., Ltd.).

Table 1 shows the results of the transfer efficiencies as measured in Example 1 and comparative example 1, employing the undercoats A and B, respectively.

TABLE 2

| | | Baking Temperature (°C.) | Baking Time (min.) | Film thickness (μm) | Volume Specific Resistivity in Powder Coating (Ω · cm) | Relative Transfer Efficiency (%) |
|---|---|---|---|---|---|---|
| Example 1 | Under Coat A | 140 | 20 | 50 | $2.3 \times 10^9$ | 100 |
| Comparative Example 1 | Under Coat B | 140 | 20 | 50 | $3.2 \times 10^{15}$ | 78 |

As understood from Table 2, the undercoating film according to Example 1, having a volume specific resistivity of not more than $10^{13}$ Ω·cm, exhibited an excellent transfer efficiency which was similar to that in the case of directly powder-coating a steel plate.

EXAMPLES 2 TO 4 AND COMPARATIVE EXAMPLES 2 AND 3

Figure 1:
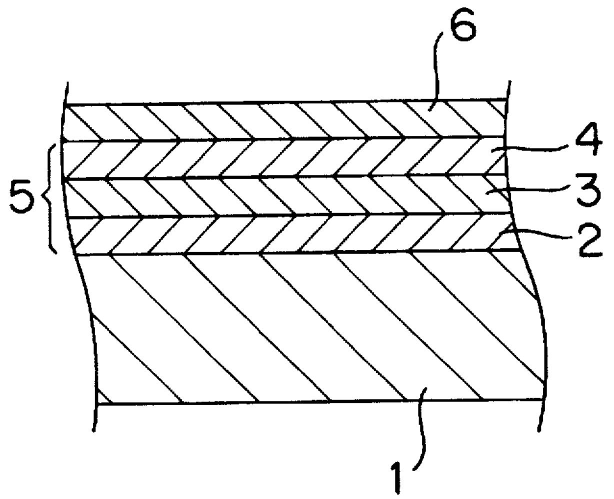
FIG. 1 is a sectional view showing an undercoating film and an overcoating layer exemplary of the present invention.

As shown in FIG. 1, a steel plate 1 was coated with an undercoating film 5 consisting of an electrodeposition base layer 2, an intermediate layer 3, and a top layer 4, and this undercoating film 5 was powder-coated with an overcoating layer 6, for evaluation of the transfer efficiency of the undercoating film 5.

The electrodeposition layer 2 was prepared from a cationic electrodeposition coating (Powertop U-80 (trade name) by Nippon Paint Co., Ltd.) and the intermediate layer 3 was prepared from a polyester intermediate coating (Orga P-2 Gray (trade name) by Nippon Paint Co., Ltd.), and these layers 2 and 3 were coated on the steel plate 1 under baking conditions shown in Table 3, and to have the thicknesses shown therein.

TABLE 3

| | Baking Temperature (°C.) | Baking Time (min.) | Film Thickness (μm) |
|---|---|---|---|
| Electodeposition/Intermediate Coating Conditions for Examples 2 to 4 and Comparative Example 2 | | | |
| Electrodeposition Layer | 170 | 20 | 30 |
| Intermediate Layer | 140 | 20 | 40 |
| Electodeposition/Intermediate Coating Conditions for Comparative Example 3 | | | |
| Electrodeposition Layer | 170 | 20 | 30 |
| Intermediate Layer | 140 | 40 | 180 |

Top coats A (Example) and B (Comparative example) were prepared as shown in Table 4, and coated on intermediate layers which were prepared in the aforementioned manner. The top coats A and B contained resin Nos. 1 and 2 which were prepared from acrylic resin (by Nippon Paint Co., Ltd.), curing agents (Cymel 303 (trade name) by Mitsui Toatsu Chemicals, Ltd.), and aluminum powder (Alupaste 7160N (trade name) by Toyo Aluminum K.K.), respectively. The amounts of the resin Nos. 1 and 2 shown in Table 4 are those of solids.

TABLE 4

| | (parts by weight) | |
|---|---|---|
| | Top Coat A | Top Coat B |
| Resin No. 1 | 38 | 60 |
| Resin No. 2 | 29 | 40 |
| Curing Agent | 16 | 40 |
| Carbon Black | 12 | — |
| Aluminum Powder | 0.1 | 16.1 |
| Barium Sulfate | 6 | — |
| Total | 101.1 | 156.1 |

Top coating layers were formed under the baking conditions and in the thicknesses shown in Table 3, to prepare undercoating films according to Examples 2 to 4 and comparative examples 2 and 3.

The thickness of each undercoating film was measured with a film thickness gauge to obtain the volume specific resistivity Rv by the following equation:

$$Rv = E \cdot S / i \cdot t$$

where E represents 100 V, S represents the area of an electrode 10, i represents the current quantity, and t represents the thickness of the undercoating film.

The undercoating films of Examples 2 to 4 and comparative examples 2 and 3 were powder-coated with an acrylic powder coating (by Nippon Paint Co., Ltd.), respectively, for evaluation of transfer efficiencies. Each of the transfer efficiencies was relatively evaluated with reference to a transfer quantity (100%) in a case of directly powder-coating the steel plate (substrate). Table 5 shows the volume specific resistivities and the transfer efficiencies of the undercoating films according to Examples 2 and 4 and comparative examples 2 and 3.

TABLE 5

| | Top Coating Layer | | | | Electrodeposition/ | Test Result | |
|---|---|---|---|---|---|---|---|
| | Type | Baking Tempera-ture (°C.) | Baking Time (min.) | Film Thick-ness (μm) | Intermediate/ Base Coating Film Thickness (μm) | Volume Specific Resistivity (Ω · cm) | Relative Transfer Efficiency (%) |
| Example 2 | A | 140 | 20 | 15 | 85 | $1.9 \times 10^{10}$ | 100 |
| Example 3 | A | 80 | 3 | 15 | 85 | $8.3 \times 10^{12}$ | 99 |
| Example 4 | A | 80 | 3 | 20 | 90 | $5.0 \times 10^{12}$ | 100 |
| Comparative Example 2 | B | 140 | 20 | 15 | 85 | $8.7 \times 10^{15}$ | 70 |
| Comparative Example 3 | A | 140 | 20 | 15 | 225 | $7.5 \times 10^{14}$ | 78 |

As clearly understood from Table 5, the undercoating films according to Examples 2 to 4, having volume specific resistivities of not more than $10^{13}$ Ω·cm, exhibited excellent transfer efficiencies, similarly to the case of directly powder-coating the steel plates.

Thus, it is understood that it is possible to extremely improve the transfer efficiency in electrostatic powder coating by reducing the volume specific resistivity of the undercoating film to not more than $10^{13}$ Ω·cm.

EXAMPLE 5 AND COMPARATIVE EXAMPLES 4 AND 5

A) Preparation of Coatings

Electrodeposition Coating A

A cationic electrodeposition coating (POWER TOP U-50 (trade name) by Nippon Paint Co., Ltd.) was employed.

Electrodeposition Coating B 12.0 parts by weight of carbon black was mixed with and dispersed in 88.0 parts by weight of cationic electrodeposition coating (POWER TOP U-50 (trade name) by Nippon Paint Co., Ltd.) by a Disper mixer (2,000 rpm, 5 minutes).

Electrodeposition Coating C 3.6 parts by weight of carbon black was mixed with and dispersed in 96.4 parts by weight of cationic electrodeposition coating (POWER TOP U-50 (trade name) by Nippon Paint Co., Ltd.) by a Disper mixer (2,500 rpm, 5 minutes).

Intermediate Coating D

A polyester intermediate coating (ORGA SELECT P-2 (trade name) by Nippon Paint Co., Ltd.) was employed.

Intermediate Coating E 4.8 parts by weight of carbon black was mixed with and dispersed in 95.2 parts by weight of polyester intermediate coating (ORGA SELECT P-2 (trade name) by Nippon Paint Co., Ltd.) by a Disper mixer (2,500 rpm, 5 minutes).

Base Coating F

A base coating F was prepared in accordance with the following formulation.

| | |
|---|---|
| Polyester Resin | 54 parts by weight |
| Melamine Resin | 26 parts by weight |
| Titanium Oxide | 16 parts by weight |
| Barium Sulfate | 4 parts by weight |
| Total | 100 parts by weight |

Base Coating G

A base coating G was prepared in accordance with the following formulation.

| | |
|---|---|
| Polyester resin | 47.5 parts by weight |
| Melamine Resin | 23.0 parts by weight |
| Titanium Oxide | 14.1 parts by weight |
| Barium Sulfate | 3.5 parts by weight |
| Carbon Black | 12.0 parts by weight |
| Total | 100.1 parts by weight |

Base Coating H

A base coating H was prepared in accordance with the following formulation.

| | |
|---|---|
| Polyester resin | 52.1 parts by weight |
| Melamine Resin | 25.1 parts by weight |
| Titanium Oxide | 15.4 parts by weight |
| Barium Sulfate | 3.9 parts by weight |
| Carbon Black | 3.6 parts by weight |
| Total | 100.1 parts by weight |

B) Preparation of Coated Plate in Example 5

1. Electrodeposition coating A was applied to a phosphate-treated steel plate (170 mm×70 mm) of 0.8 mm in thickness and baked at 170° C. for 20 minutes to be a coating thickness of 22 μm.
2. Intermediate coating D was applied to the coated plate obtained in the above step 1 hour and baked at 140° C. for 20 minutes to be a coating thickness of 28 μm.
3. Base coating G was applied to the coated plate obtained in the above step 2 and baked at 140° C. for 20 minutes to be a coating thickness of 22 μm.

C) Preparation of Coated Plate In Comparative Example 4 (carbon black is contained only in electrodeposition layer directly on steel plate).

1. Electrodeposition coating B was applied to a phosphate-treated steel plate (170 mm×70 mm) of 0.8 mm in thickness and baked at 170° C. for 20 minutes to be a coating thickness of 21 μm.
2. Intermediate coating D was applied to on the coated plate obtained in the above step 1, and baked at 140° C. for 20 minutes to be a thickness of 28 μm.
3. Base coating F was applied to the coated plate obtained in the above step 2 and baked at 140° C. for 20 minutes to be a thickness of 21 μm.

D) Preparation of Coated Plate in Comparative Example 5 (carbon black contained in each layer of electrodeposition coating, intermediate coating, and base coating layers in amounts corresponding to their thickness so that a total amount of carbon black in these layers is equal to that in Example 5 above).

1. Electrodeposition coating C was applied to a phosphate-treated steel plate (170 mm×70 mm) of 0.8 mm in thickness and baked at 170° C. for 20 minutes to be a thickness of 22 μm.
2. Intermediate coating E was applied to the coated plate obtained in the above step 1 and baked at 140° C. for 20 minutes to be a thickness of 28 μm.
3. Base coated H was applied to the coated plate obtained in the above step 2 and baked at 140° C. for 20 minutes to be a thickness of 22 μm.

E) Evaluation Method

Volume Specific Resistivity

Volume specific resistivity of each sample was evaluated by UNIVERSAL ELECTROMETER MMA II-17 (by Kawaguchi Denki Co., Ltd.) having concentric parallel plate electrodes.

Relative Transfer Efficiency

Relative transfer efficiency of each sample was evaluated by powder-coating with an acrylic powder coating (by Nippon Paint Co., Ltd.) employing a corona-electrical-charging type of electrostatic spraying machine.

The results of these measurements are set forth in Table 6 below.

TABLE 6

| | Film Thickness (μm) | | | | Volume | Weight of | Relative |
|---|---|---|---|---|---|---|---|
| | Electrode position Layer | Intermediate Layer | Top Layer | Total Thickness | Specific Resistivity (Ω · cm) | Transferred Powder (g) | Transfer Efficiency (%) |
| Inventive Example 5 | 22 | 28 | 21 | 71 | $1.65 \times 10^{12}$ | 1.23 | 100 |
| Comparative Example 4 | 21 | 28 | 21 | 70 | $1.1 \times 10^{15}$ | 0.85 | 69 |
| Comparative Example 5 | 22 | 28 | 21 | 71 | $4.2 \times 10^{15}$ | 0.86 | 70 |

As seen from the above Table 6, the Inventive Example 5 in accordance with the present invention exhibited lower volume specific resistivity and excellent transfer efficiency compared to the samples prepared in Comparative Examples 4 and 5.

While the above examples have been described with reference to a single-layer undercoating film and three-layer films consisting of electrodeposition, intermediate, and top coating layers with only the top layer containing conductive material, the undercoating film according to the present invention is not restricted to such structures, but may have any structure so long as the same can serve as a substrate for electrostatic powder coating.

Figure 2:
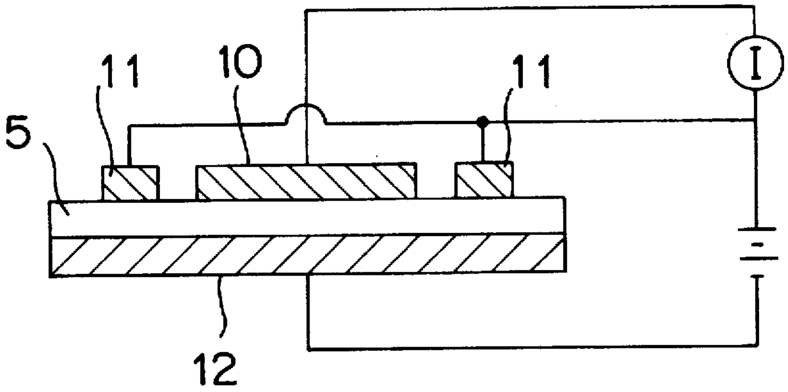
FIG. 2 is a block diagram for illustrating a method of measuring a volume specific resistivity exemplary of the present invention.

The volume specific resistivity of each undercoating film obtained in the aforementioned examples and comparative example was measured by the method as described herein. As shown in FIG. 2, an electrode 10 of conductive rubber having a diameter of 50 mm was placed on an undercoating film 5 as shown in FIG. 2 and a ring-shaped guard electrode 11 was placed around the electrode 10 while another electrode 12 was provided under the undercoating film 5, and the volume specific resistivity was measured with application of a voltage of 100 v.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electrostatic powder coating method comprising the steps of:

forming an undercoating film having a volume specific resistivity of not more than about $10^{13}$ Ω·cm and a thickness of not more than 200 μm on a metal substrate, said undercoating film being formed of a plurality of layers wherein only a top layer of said plurality of layers includes a conductive material, the layers of said undercoating film between said metal substrate and said top layer being nonconductive; and forming an overcoating layer on said top layer of said undercoating film by electrostatic powder coating.

2. The electrostatic powder coating method in accordance with claim 1, wherein said volume specific resistivity of said undercoating film is from about $10^8$ to $10^{13}$ Ω·cm.

3. The electrostatic powder coating method in accordance with claim 1, wherein said conductive material is carbon black.

4. The electrostatic powder coating method in accordance with claim 1, wherein said conductive material is zinc oxide or tin oxide.

5. The electrostatic powder coating method in accordance with claim 1, wherein said undercoating film is a multilayer coating film consisting of an electrodeposition base layer on the metal substrate, an intermediate layer on the electrodeposition base layer, and the top layer on the intermediate layer, with only said top layer containing a conductive material.

6. The electrostatic powder coating method in accordance with claim 5, wherein said conductive material is carbon black.

7. The electrostatic powder coating method in accordance with claim 5, wherein said conductive material is zinc oxide or tin oxide.

8. The electrostatic powder coating method in accordance with claim 5, wherein said base layer of the undercoating film is a cationic electrodeposition coating.

9. The electrostatic powder coating method in accordance with claim 5, wherein said intermediate layer and top layer of the undercoating film comprise a synthetic resin.

10. The electrostatic powder coating method of claim 5, wherein said intermediate layer comprises a polyester resin.

11. The electrostatic powder coating method of claim 5, wherein said top layer comprises a polyester resin and melamine resin.

12. A metal substrate coated according to the method of claim 1.

13. A metal substrate coated according to the method of claim 5.

* * * * *